3,055,947
PROCESS FOR PRODUCING VINYL AROMATIC OXYMETHYL COMPOUNDS
John G. Abramo, Springfield, Mass., assignor to Monsanto Chemical Company, St. Louis, Mo., a corporation of Delaware
No Drawing. Filed July 11, 1958, Ser. No. 747,828
10 Claims. (Cl. 260—611)

The present invention relates to vinyl compounds and more particularly to the production of vinyl or alkylene aromatic oxymethyl compounds having the structure:

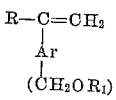

wherein Ar is an aromatic radical, R is selected from the class consisting of hydrogen and methyl radical, $R_1$ is selected from the class consisting of hydrogen, alkyl, aryl, aralkyl, oxyalkylene, and oxyarylene radicals and $n$ is an integer of 1–3.

Vinyl aromatic methyl alcohols and ethers, more generally vinyl aromatic oxymethyl compounds, due to the presence of alkylene substituents, have utility as monomeric constituents which can be copolymerized or homopolymerized to form polymeric materials. Their use in the past, particularly referring to the alcohols now, has been limited because of the expense resulting from the complexity attributed to their production by the prior art. In this regard, various multi-step processes have been used. Illustrative are the procedures set forth in U.S. 2,531,355 and 2,439,204.

Accordingly, it is a principal object of this invention to produce vinyl or alkylene aromatic methyl alcohols and ethers.

Another object is to provide an improved and simplified method by which to obtain these monomeric compounds.

Other objects of the invention will in part be obvious and will in part appear hereinafter.

These and other object of the invention are attained by reacting at a temperature of 50°–200° C. (a) a haloalkyl aromatic halomethyl compound having the structure:

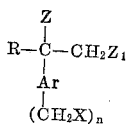

and (b) a hydroxyl composition having the structure:

wherein throughout Ar is an aromatic radical, R is selected from the class consisting of hydrogen and methyl radical, $R_1$ is selected from the class consisting of hydrogen, alkyl, aryl, aralkyl, oxyalkylene and oxyarylene radicals, X is a halogen, Z and $Z_1$ are selected from the class consisting of hydrogen and halogen one of which is halogen and $n$ is an integer of from 1–3 in the presence of (c) a base metal component having the structure:

wherein M is a base metal and the number of equivalents of $OR_1$ radical used is at least twice the molar amount of said haloalkyl aromatic halomethyl compound.

The following examples are given in illustration of the invention. Where parts are mentioned parts by weight are intended unless otherwise described.

*Example I*

A solution of 60 grams of sodium hydroxide in 500 mls. of water is heated to reflux followed by addition of 95 grams of p-(beta-chloroethyl)benzyl chloride and refluxing for an additional hour. The organic layer which results is separated, diluted with benzene, and then washed with dilute sulfuric acid, followed by washing with water. After drying and removal of the benzene by distillation, the remaining material is distilled under vacuum. The first fraction, boiling on the order of 77° C./0.35 mm. Hg pressure, is the starting material, and the second fraction, boiling at about 79° C./0.25 mm. Hg pressure, is p-vinylbenzyl alcohol. Infrared analysis confirms the presence of hydroxyl, phenyl and vinyl groups in the second fraction.

*Example II*

A solution of 250 grams of normal butyl alcohol and 34 grams of potassium hydroxide is heated to 100° C. followed by dropwise addition of 28 grams of p-(beta-chloroethyl)benzyl chloride. The solution is then refluxed for an additional 3 hours. The reaction mixture is washed with several portions of water to remove potassium salts and the excess butanol is removed under vacuum. Twenty grams of p-vinylbenzyl butyl ether is distilled at 69°–71° C./0.25 mm. Hg pressure which corresponds to a yield of 71%. The refractive index of this material is determined to be $n_D^{25}$ 1.5181 (D line of sodium and 25° C.). When analyzed and calculated for $C_{13}H_{18}O$, theoretical values are C, 82.10; H, 9.47; while the determined values are C, 82.81 and H, 10.04. The infrared spectrum indicates the presence of vinyl phenyl and ether groups further establishing that the product is p-vinylbenzyl butyl ether.

*Example III*

Eighty-four grams of potassium hydroxide and 392 grams of 2-ethylhexanol are stirred and heated in a flask to 110° C. To this add dropwise 95 grams (0.5 mol) of p-(beta-chloroethyl)benzyl chloride. After completion of the addition, heating and stirring is continued for a period of three hours. The resultant reaction mixture is washed with water to remove the inorganic materials and magnesium sulfate is added and the mixture allowed to stand for a period gerater than one hour. The magnesium sulfate is then removed by filtration and the remaining 2-ethylhexanol removed by vacuum distillation. The product remaining is distilled at 100°–103° C./0.15 mm. Hg and is identified as p-vinylbenzyl 2-ethylhexyl ether by the analytical procedures previously described.

The vinyl or alkylene aromatic oxymethyl compounds which are produced according to the process of the present invention include those having the structure:

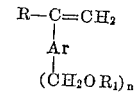

wherein Ar is an aromatic radical, R is selected from the class consisting of hydrogen and methyl radical, $R_1$ is selected from the class consisting of hydrogen, alkyl, aryl, aralkyl, oxyalkylene and oxyarylene radicals and $n$ is an integer of 1–3. The simplest examples of these compounds are the o-, m- and p-vinylbenzyl alcohols and corresponding vinylbenzyl ethers. When R is methyl rather than hydrogen these are the o-, m- and p-(2-propylene)benzyl alcohols and corresponding ethers.

Other vinyl aromatic methyl alcohols and ethers are also intended, as for example where the aromatic Ar is a naphthyl-type, anthryl-type and like radicals in place of the phenyl-type radical contained in the benzyl compositions. Examples of these include vinylnaphthylmethyl alcohol and corresponding ethers, vinylanthrylmethyl alcohols and corresponding ethers, and the like. Additionally, nuclear substituents, which have not been designated on the structural formulae, such as the halogens, alkyl radicals such as methyl, ethyl etc. can be accommodated on the aromatic ring structure Ar.

In the case of the ethers, as distinguished from the alcohols, preference is directed to those having 1–10 carbon atoms when the group or radical identified as $R_1$ is an alkyl derivative as exemplified by the methyl, ethyl, normal and isomeric propyl, butyl, and like ethers. In addition to the alkyl ethers, the aryl ethers such as phenyl and substituted phenyls, the aralkyls and the oxyalkylenes and oxyarylenes such as the residues of ethylene glycol, diethylene glycol and ethers of these glycols are intended. When the aryl ethers are involved $R_1$ is preferably 6–20 carbon atoms.

Considered from the standpoint of the principal substituents on the aromatic radical Ar the mono-vinyl or alkylene substituent, parenthetically which is limited to one in number, can be either a two or three carbon member having a single unsaturation. The oxymethyl substituent which is preferentially singular in number can be in the o-, m- or p- position with the latter position preferred, when Ar is a phenyl-type radical. More than one of the oxymethyl groups may, however, be included on the aromatic ring Ar as indicated by $n$ being equal to an integer of 1–3. The increase in the number of these latter substituents interferes in ascendancy with the facility of the compounds to be isolated from a given reaction medium.

The starting material, haloalkyl aromatic halomethyl compound, has the structure:

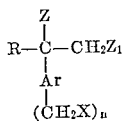

otherwise corresponding with the vinyl or alkylene aromatic oxymethyl final product wherein R has previously been described as hydrogen or methyl radical, and further Z and $Z_1$ are selected from the class consisting of hydrogen and halogen with the further proviso that one must be halogen, thus the alpha and beta halogen can be used with the preference directed to the use of chlorine in the beta position. When the alpha-beta halogen variation is used however a less desirable product can result in one of the halogens being retained on the vinyl substituent of the final product. The number of the halomethyl substituents, as well as the constituency of the aromatic radical Ar, corresponds with those of the desired vinyl aromatic oxymethyl product.

In accordance with the preceding, p-(beta-chloroethyl)-benzyl chloride and p-(alpha-chloroethyl)benzyl chloride represent the simplest starting materials with which to produce the corresponding simplest vinyl aromatic oxymethyl compounds, to wit: those having present a vinylbenzyl structure. The starting materials in turn can be provided by chloromethylation of the corresponding chloroethylbenzene. The remaining haloalkyl aromatic halomethyl starting materials can also be obtained in like manner by halomethylation of the corresponding haloalkyl aromatic compound.

The haloalkyl aromatic halomethyl compounds, as previously described, are caused to react with a hydroxyl composition having the structure:

$$R_1OH$$

As previously described in relation to the desired vinyl aromatic oxymethyl products, $R_1$ can be hydrogen, alkyl, aryl, aralkyl, oxyalkylene and oxyarylene radicals. Accordingly, the hydroxyl composition can be water, various alkyl, aryl, aralkyl alcohols such as methyl, ethyl and propyl alcohols, phenol, xylenol, benzyl alcohol, cresol, in addition to ethylene glycol, diethylene glycol, etc. and monoethers of ethylene and diethylene glycol in all of which the organic residue is preferably limited to those having 1–10 carbon atoms when alkyl-type ethers are involved and 6–20 carbon atoms when aryl-type ethers are involved. When the intended vinyl aromatic oxymethyl product is an alcohol, water is used. Additionally, production of mixtures of vinyl aromatic methyl alcohols and ethers can be facilitated by using a mixture of water and one of the defined alcohols.

The base metal component used is one which ionizes to give hydroxy and alkoxy anions preferably, and broadly the anions $OR_1$ corresponding to those contained on the oxymethyl substituent of the vinyl aromatic oxymethyl product, in the presence of water or other solvents. These include the alkali methyl hydroxides and alkoxides, to wit: those of lithium, sodium, potassium, rubidium, and cesium, the alkaline earth metal hydroxides and alkoxides, to wit: those of magnesium, calcium, strontium, barium as well as others such as aluminum hydroxide and alkoxides. The alkoxides as previously indicated are preferably those in which the alkyl radical $R_1$ is limited to 1–10 carbon atoms. These can be added as such or can be produced in situ by adding the corresponding base metal or base metal oxide to a medium contining water or alcohol-type compounds. The preferred hydroxides are those of sodium and potassium and the alkoxides are aluminum butoxide, calcium isopropoxide, potassium methoxide, sodium ethoxide, and the like.

The amount of hydroxide or alkoxide or mixture of both to be used is determined by the number of halogens to be replaced on the haloalkyl aromatic halomethyl starting material. Under any condition there will be at least two displaceable halogens, at least one on the haloalkyl substituent designed for unsaturation and one on each of the halomethyl substituents, with a minimum of one of these latter substituents present. Additionally a molar excess of the hydroxyl or alkoxide ion is desirable. Thus, the number of equivalents of hydroxide or alkoxide ion used should be least twice the molar amount of said haloalkyl aromatic halomethyl compound and will be increased in accordance with increase in the number of halogens to be displaced.

In practicing the process of the present invention, a haloalkyl aromatic halomethyl compound as previously described and corresponding to the desired vinyl aromatic oxymethyl product is reacted with the hydroxyl composition having the desired structure, as to the aromatic radical Ar and substituents thereon, and in the presence of the base metal hydroxide or alkoxide at a temperature of 50°–200° C. The reaction can be carried out in a solvent system or as a homogeneous reaction mixture or suspension system and under reflux conditions. The reaction can also be carried out under atmospheric, subatmospheric, or super-atmospheric pressure. The temperature may vary between the range of 50°–200° C. with a further preference directed to a range of 90°–110° C. The reaction which takes place can be represented as follows:

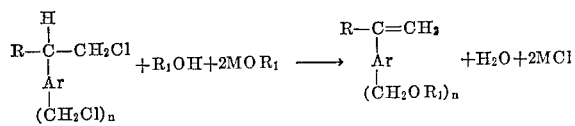

The period for reaction will vary in accordance with the reactants and conditions used. In general, times ranging from 1–6 hours have been found satisfactory. After reaction has taken place the vinyl aromatic oxymethyl compound is separated from the reaction medium by any convenient method such as steam distillation, fractional distillation, solvent separation, and the like.

The products obtained by the process of the present invention have utility as monomeric components with which to form polymers containing functional groups, particularly hydroxyl groups and ether groups. The presence of these functional groups on the copolymers or homopolymers which result, lend attractiveness to their use in coatings on glass, metals and other surfaces together with contributing resistance to hydrocarbon solvents. Additionally, in the case of the hydroxyl group, their presence on the polymerized materials can serve as sites for further reaction with melamines, diisocyanates and the like with which to provide cross-linkaging, while the presence of the ether groups will enhance the adhesiveness of the materials.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

What is claimed is:

1. A process for producing vinyl aromatic oxymethyl compounds having the structure:

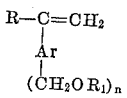

which comprises reacting at a temperature of 50°–200° C. (a) a haloalkyl aromatic halomethyl compound having the structure:

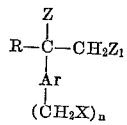

and (b) a hydroxyl composition having the structure:

in the presence of (c) a base metal component having the structure:

wherein throughout Ar is selected from the class consisting of aromatic radicals containing 6–14 carbon atoms in the basic cyclic structure thereof, M is selected from the class consisting of alkali metals, alkaline earth metals and aluminum, R is selected from the class consisting of hydrogen and methyl radicals, $R_1$ is selected from the class consisting of hydrogen, alkyl, aryl, aralkyl, oxyalkylene and oxyarylene radicals, X is a halogen, Z and $Z_1$ are selected from the class consisting of hydrogen and halogen one of which is halogen and $n$ is an integer of from 1–3 and the number of equivalents of $OR_1$ of said base metal component are at least about twice the molar amount of said haloalkyl aromatic halomethyl compound.

2. A process according to claim 1 wherein the haloalkyl aromatic halomethyl compound is p-(beta-chloroethyl)benzyl chloride.

3. A process according to claim 1 wherein the haloalkyl aromatic halomethyl compound is p-(alpha-chloroethyl)benzyl chloride.

4. A process according to claim 1 wherein the base metal component is sodium hydroxide.

5. A process according to claim 1 wherein the base metal component is potassium hydroxide.

6. A process according to claim 1 wherein the hydroxyl composition comprises water.

7. A process according to claim 1 wherein the hydroxyl composition comprises alcohols having 1–10 carbon atoms.

8. A process according to claim 2 wherein the hydroxyl composition comprises butyl alcohol.

9. A process according to claim 2 wherein the hydroxyl composition comprises 2-ethylhexanol.

10. A process according to claim 1 wherein the reaction temperature is between 90°–110° C.

References Cited in the file of this patent

UNITED STATES PATENTS

| | | |
|---|---|---|
| 1,999,315 | Baldwin et al. | Apr. 30, 1935 |
| 2,139,369 | Kyrides | Dec. 6, 1938 |
| 2,392,733 | Goddin et al. | Jan. 8, 1946 |
| 2,522,501 | Brooks et al. | Sept. 19, 1950 |
| 2,531,355 | Emerson | Nov. 21, 1950 |
| 2,799,694 | Ross et al. | July 16, 1957 |
| 2,836,626 | Hatlelid | May 27, 1958 |

FOREIGN PATENTS

| | | |
|---|---|---|
| 559,737 | Germany | Sept. 23, 1932 |

OTHER REFERENCES

Emerson et al.: Jour. Amer. Chem. Soc., vol. 69 (August 1947), pp. 1905–1906 (2 pp.).

Ross et al.: Jour. Amer. Chem. Soc., vol. 69 (1947), p. 1917 (1 p.).